(12) United States Patent  
Schukovets et al.

(10) Patent No.: US 12,079,284 B2  
(45) Date of Patent: Sep. 3, 2024

(54) GENERATING DATA REGULATION COMPLIANT DATA FROM APPLICATION INTERFACE DATA

(71) Applicant: SAP SE, Walldorf (DE)

(72) Inventors: Igor Schukovets, Heiligkreuzsteinach (DE); Alexey Streltsov, Heidelberg (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 17/402,940

(22) Filed: Aug. 16, 2021

(65) Prior Publication Data

US 2023/0053109 A1 Feb. 16, 2023

(51) Int. Cl.  
*G06F 16/93* (2019.01)

(52) U.S. Cl.  
CPC .................... *G06F 16/93* (2019.01)

(58) Field of Classification Search  
CPC .. G06F 21/6254; G06F 21/6245; G06F 21/62; G06F 21/6227; G06F 16/84; G06F 16/88; G06F 16/116; G06F 16/215; G06F 16/1794; G06F 16/258; G06F 16/93  
See application file for complete search history.

(56) References Cited

U.S. PATENT DOCUMENTS

| | | | | |
|---|---|---|---|---|
| 7,500,178 | B1 * | 3/2009 | O'Donnell | G06Q 10/0875 715/221 |
| 9,930,113 | B2 | 3/2018 | Schukovets et al. | |
| 10,362,140 | B2 | 7/2019 | Schukovets et al. | |
| 10,482,174 | B1 * | 11/2019 | Goodsitt | G06V 10/82 |
| 10,713,246 | B2 | 7/2020 | Schukovets et al. | |
| 11,048,725 | B2 | 6/2021 | Schukovets et al. | |
| 2009/0235199 | A1 * | 9/2009 | Mastie | G06F 21/84 715/781 |
| 2010/0131551 | A1 * | 5/2010 | Benzaken | G06F 21/6245 715/810 |
| 2010/0192220 | A1 * | 7/2010 | Heizmann | G06F 11/3664 717/124 |
| 2014/0123057 | A1 * | 5/2014 | Eigner | G06F 21/60 715/780 |
| 2016/0283729 | A1 * | 9/2016 | Vidhani | G06F 21/6254 |
| 2017/0187834 | A1 | 6/2017 | Schukovets et al. | |
| 2019/0034511 | A1 | 1/2019 | Schukovets et al. | |
| 2019/0114341 | A1 | 4/2019 | Schukovets et al. | |
| 2021/0225468 | A1 * | 7/2021 | Saliman | G16H 50/30 |

* cited by examiner

*Primary Examiner* — Hau H Hoang  
(74) *Attorney, Agent, or Firm* — Fish & Richardson P.C.

(57) ABSTRACT

The present disclosure involves systems, software, and computer-implemented methods for generating data regulation-compliant data from application interface data. One example method includes receiving a request for creation of document data. The request includes personal data of a user. Document data, including at least some of the personal data, is created based on the request. The document data is encoded into an encoded document that does not include any personal data of the user and includes structural information that describes the structure of the document data. A request to use the encoded document is received and the encoded document is decoded. A synthetic document is generated using the structural information included in the encoded document. Generation of the synthetic document includes insertion of synthetic user data into the synthetic document at positions in the synthetic document that correspond to positions of personal data within the document data.

19 Claims, 9 Drawing Sheets

FIG. 2

| | | PURCHASE ORDER | |
|---|---|---|---|
| Company Name and logo | | | |
| Street Address | | PO number | PO DATE |
| Zip, city | | enter number | 24.11.2014 |
| Phone: | | | |
| Fax: | | | |

↑ 206

| VENDOR | | | |
|---|---|---|---|
| Name | | | |
| Company Name | | SHIP TO | |
| Street Address | | Name | |
| City, ST ZIP | | Company Name | |
| Phone | | Street Address | |
| Email Address | | City, ST ZIP | |
| | | Phone | |

| | | | | DELIVER TO | | |
|---|---|---|---|---|---|---|
| | | | | Name | | |

| PO Number | Buyer | Date | Vendor No | Terms | | Ship via |
|---|---|---|---|---|---|---|

| IT | Part number | DESCRIPTION | QTY | UNIT PRICE | AMOUNT |
|---|---|---|---|---|---|
| 1 | 1233 | Product 1 | 1 | 150,00 | 150,00 |
| 2 | 1234 | Product 2 | 4 | 72,00 | 288,00 |
| 3 | 1235 | Service 1 | 4 | 50,00 | 200,00 |
| | | | | | - |
| | | | | TOTAL NET | $ 638,00 |

⇧

| | | PURCHASE ORDER | |
|---|---|---|---|
| Company Name and logo | | | |
| Street Address | | PO number | PO DATE |
| Zip, city | | enter number | 24.11.2014 |
| Phone: | | | |
| Fax: | | | |

| VENDOR | | | |
|---|---|---|---|
| Name | | | |
| Company Name | | SHIP TO | |
| Street Address | | Name | |
| City, ST ZIP | | Company Name | |
| Phone | | Street Address | |
| Email Address | | City, ST ZIP | |
| | | Phone | |

| | | | | DELIVER TO | | |
|---|---|---|---|---|---|---|
| | | | | Name | | |

| PO Number | Buyer | Date | Vendor No | Terms | | Ship via |
|---|---|---|---|---|---|---|

| IT | Part number | DESCRIPTION | QTY | UNIT PRICE | AMOUNT |
|---|---|---|---|---|---|
| 1 | 1233 | Product 1 | 1 | 150,00 | 150,00 |
| 2 | 1234 | Product 2 | 4 | 72,00 | 288,00 |
| 3 | 1235 | Service 1 | 4 | 50,00 | 200,00 |
| | | | | | - |
| | | | | TOTAL NET | $ 638,00 |

FIG. 2

| | documentid | mapid | xmap |
|---|---|---|---|
| 306₀ | 4110000135 | 0000800180000000100020102140800 | {"vers":"0","mhash":"F8ACF272","d":"E64070","bsart":"NB","waers":"EUR","t":[{"d":"CE08600006","pstyp":"0","S":[{"d":"E9"}]}]} |
| 308₁ | 4110000997 | 0000800180000000100020102140800 | {"vers":"0","mhash":"F8ACF272","d":"E64070","bsart":"NB","waers":"EUR","t":[{"d":"CE08600006","pstyp":"0","S":[{"d":"E9"}]}]} |
| 310₂ | 4110000998 | 0000800180000000100020102140800 | {"vers":"0","mhash":"F8ACF272","d":"E64070","bsart":"NB","waers":"EUR","t":[{"d":"CE08600006","pstyp":"0","S":[{"d":"E9"}]}]} |
| 312₃ | 4110000999 | 0000800180000000100020102140800 | {"vers":"0","mhash":"F8ACF272","d":"E64070","bsart":"NB","waers":"EUR","t":[{"d":"CE08600006","pstyp":"0","S":[{"d":"E9"}]}]} |
| 314₄ | 4110001001 | 0000800180000000100020102140800 | {"vers":"0","mhash":"F8ACF272","d":"E64070","bsart":"NB","waers":"EUR","t":[{"d":"CE08600004","pstyp":"0","S":[{"d":"E9"}]}]} | binmap

GENERATING DATA REGULATION COMPLIANT DATA FROM APPLICATION INTERFACE DATA

TECHNICAL FIELD

The present disclosure relates to computer-implemented methods, software, and systems for generating data regulation-compliant data from application interface data.

BACKGROUND

Data privacy regulations, such as General Data Protection Regulation (GDPR), define a specific set of rules that protect user data and create transparency for use or prevention of the use of user data. For example, regulations can stipulate that no personal data or personally identifiable information is processed except in response to explicit permission from a user. Some data regulations, such as GDPR, may permit the collection, processing, and storage of anonymized data without user consent.

SUMMARY

The present disclosure involves systems, software, and computer implemented methods for generating data regulation compliant data from application interface data. One example method includes: receiving a request from a user at an application programming interface for the creation of document data for a document, wherein the request includes personal data of the user; creating the document data for the document based on the request, wherein the document data includes at least some of the personal data; encoding the document data to generate an encoded document, wherein the encoded document does not include any personal data of the user and includes structural information that describes the structure of the document data; storing the encoded document in a repository; identifying a request to use the encoded document; decoding the encoded document, wherein the decoding includes: generating synthetic user data to include in a synthetic document; generating the synthetic document using the structural information included in the encoded document; and inserting the synthetic user data into the synthetic document at positions in the synthetic document that correspond to positions of personal data within the document data; and providing the synthetic document in response to the request to use the encoded document.

Implementations may include one or more of the following features. The encoded document can be a textual document. The textual document can be a JSON (JavaScript Object Notation) document. The encoded document describes fields for which field values are included in the request from the user without specifying the field values. The encoded document can be a binary vector. The binary vector can include a bit for every possible field supported by the application programming interface. The bit for a possible field can have a one value if the request from the user includes a field value for the field and a zero value if the request from the user does not include a value for the field. The request to use the encoded document can be a request to regression test the application programming interface in response to a change in the application programming interface. Providing the synthetic document can include providing the synthetic document to a test system for regression testing of the application programming interface. Multiple encoded documents in the repository can be clustered to create at least one cluster of encoded documents. An encoded document can be selected from each cluster as a representative encoded document of the cluster. Each representative encoded document can be decoded and the decoded documents can be used to regression test the application programming interface in response to a change in the application programming interface. The personal data can be subject to at least one data regulation.

While generally described as computer-implemented software embodied on tangible media that processes and transforms the respective data, some or all of the aspects may be computer-implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DESCRIPTION OF DRAWINGS

FIG. 2 is a diagram that illustrates fields of a document.

FIGS. 3A-3B are a diagram that illustrates encoding of document data provided to an application programming interface.

DETAILED DESCRIPTION

Figure 1:
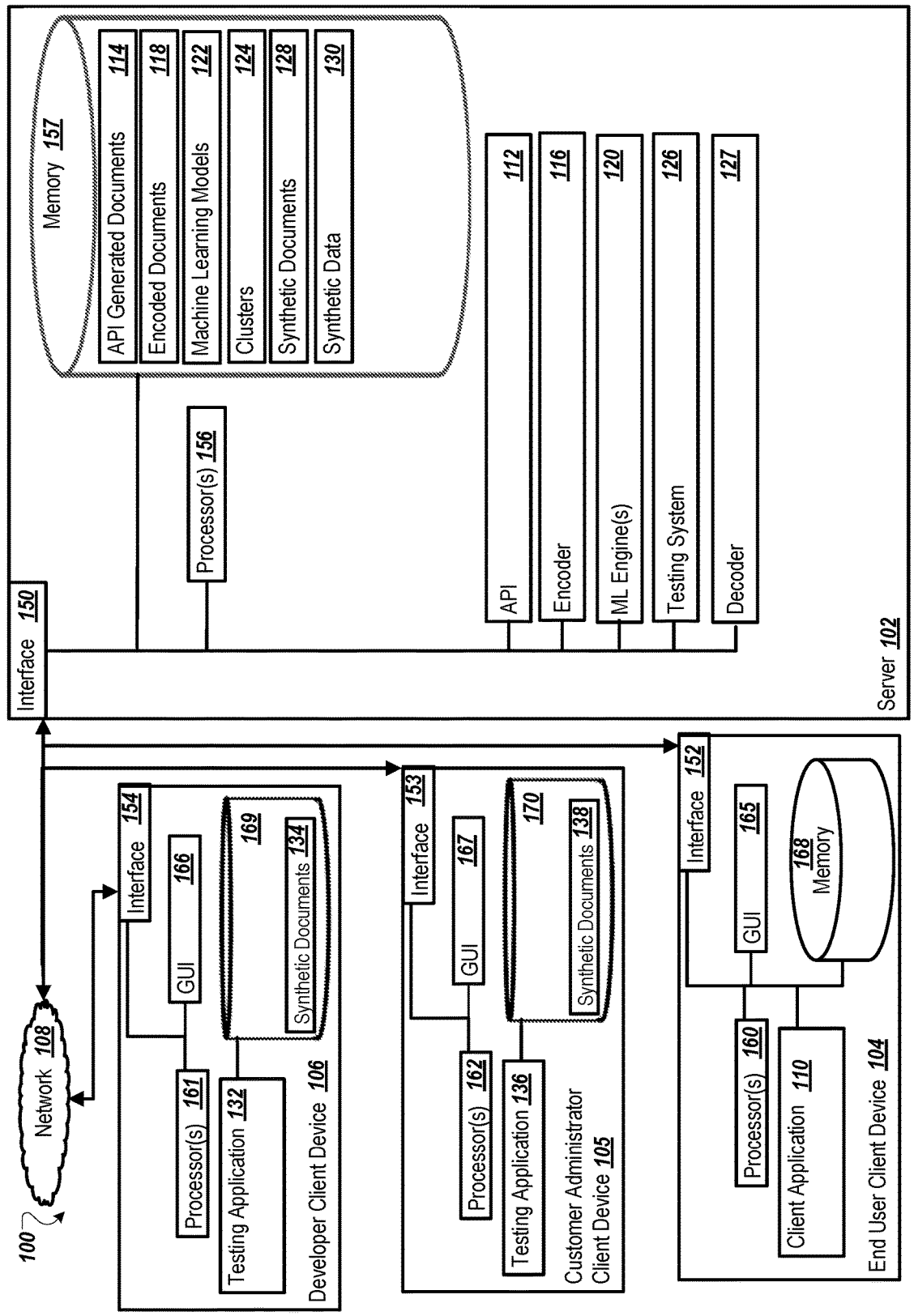
FIG. 1 is a block diagram illustrating an example system for generating data regulation compliant data from application interface data.

Data regulations concerning privacy can prevent specific processing by a service provider of documents that include user information. For example, a purchase order document may have a user name and details about what products a user ordered. The service provider may wish to analyze documents for errors and/or consistency, but data regulations may not allow directly accessing or processing user-specific information. As another example, developers of a purchase order API (Application Programming Interface) may be interested in analyzing data of purchase order requests to see how customers make such requests and what data is included in the requests, for example, to understand inconsistent or incorrect use of the API and/or to discover errors in the API. However, regulations may prohibit developers from using actual user data.

As yet another example, to analyze actual full documents might be prohibitive from a performance standpoint due to the size and number of the documents generated during production. Also, analyzing actual full documents may be inefficient since, for interfaces such as a purchase order interface, a substantial number of the documents may be similar. Repeatedly testing multiple documents with the same, similar, or structurally similar or identical documents may not be efficient from a testing standpoint. Testing APIs can pose a particular challenge for developers since APIs may be continually developed even while customers continue to use the APIs. A challenge and goal for developers for maintaining existing APIs is to avoid regression errors for customer scenarios that have been previously running successfully.

Rather than processing actual documents that include actual customer data, an encoded version of a document can be processed that represents the structure of the document. The encoded version of the document can indicate which fields are present in the document, without revealing the values of the fields. For certain types of analysis, the actual values of the field may not be necessary, for example. Working with encoded versions of documents does not violate regulations since actual user data is no longer present in the encoded documents.

Encoded documents can result in resource savings since encoded documents can be substantially smaller in size than corresponding original documents. Accordingly, analysis of a larger number of encoded documents may be enabled, as compared to analyzing original documents. An analysis team or system may have access to limited processing, data storage, and human resources. Encoded documents could allow specific types of processing using the limited resources, such as a more significant number of documents, than was possible if only original documents were analyzed. As mentioned, original documents with user data may not have been accessible to the analysis system.

Various types of machine learning analysis can be performed on the encoded documents while complying with data privacy regulations. As another example, synthetic documents can be generated from encoded documents to reinsert synthetic user data in place of the actual user data that was removed during encoding. Synthetic documents can be used, for example, for testing, as described in more detail below. The use of synthetic documents can improve testing and decrease regression errors.

FIG. 1 is a block diagram illustrating an example system 100 for generating data regulation-compliant data from application interface data. Specifically, the illustrated system 100 includes or is communicably coupled with a server 102, an end-user client device 104, a customer administrator client device 105, a developer client device 106, and a network 108. Although shown separately, in some implementations, the functionality of two or more systems or servers may be provided by a single system or server. In some implementations, the functionality of one illustrated system or server may be provided by multiple systems or servers.

A client application 110 running on the end-user client device 104 can request an API 112 provided by the server 102. As an example, the API 112 can be a purchase order interface, a sales order interface, an invoicing interface, or another type of interface that handles requests related to complex documents or objects. A complex document or object can be, for example, a document that may include various combinations of a substantial number of possible fields. A purchase order document may include combinations of hundreds of potential fields, for example. In response to the request from the client application 110, the API 112 can create an API-generated document 114. For some types of requests, the API 112 can provide the API-generated document 114 to the client application 110 or provide a different response to the client application 110.

The request from the client application 110 can include personal data for a user of the client device 110. Personal data can be subject to one or more data regulations (GPDR). The data regulations can specify that no personal data or personally identifiable information is processed by the server 102 except in response to explicit permission from a user or an authorized purpose. Accordingly, the server 102 is not permitted to perform processing on the API-generated documents 114 except for direct handling of user-authorized requests.

To perform analysis on request data received at the API 112, an encoder 116 can perform an encoding process on the API-generated documents 114 to create encoded documents 118. The encoded documents 118 can include structural information that describes the structure of document data included in the API-generated documents 114, without including personal data that may be included in the API-generated documents 114. For example, for any field which may include personal data, the encoded document 118 can indicate that a field value was provided without specifying the actual field value. Different types of encoded documents 118 can be generated, as described in more detail below.

Since the encoded documents 118 no longer include personal data, the encoded documents 118 can be stored indefinitely at the server 102. Various types of processing and analysis can be performed using the encoded documents 118. For example, one or more machine learning (ML) engines 120 can process the encoded documents using one or more machine learning models 122. In some cases, the machine learning engines 120 use one or more clustering algorithms to create clusters 124 of encoded documents. The clusters 124 can represent common use cases or edge cases of the API 112, for example.

By analyzing information in the clusters 124, developers may understand and learn about typical user scenarios involving the API 112. By better understanding user scenarios, developers can prepare better test cases using a testing system 126. Developers, both at a service provider and a customer installation, may perform regression testing to ensure that any new changes to the API 112 do not result in errors occurring in user scenarios with the API 112 that previously were handled successfully. For example, an invalid modification to the API 112 could have undesired and unexpected side effects.

To create test cases, the testing system 126 can use a decoder 127 to decode selected encoded documents 118 (e.g., encoded documents identified as representative of the clusters 124 or other encoded document(s) 118). Decoded documents can be referred to as synthetic documents 128. The decoder 127 can create a synthetic document 128 that is a "restoration" or a simulation of an original API-generated document 114. The decoder 127 can create a synthetic document 128 based on structural information about an API-generated document 114 that is included in a corresponding encoded document 118. The decoder 127 can identify portions of the synthetic document 128 at which personal information was included in the original API-generated document 114. The decoder 127 can generate synthetic data 130 and insert the synthetic data 130 into the synthetic document 128, at positions within the synthetic document 128 that correspond to locations within the original API-generated document 114 at which personal information was included. Other synthetic data 130 can be inserted into the synthetic document 128, as needed.

The synthetic document 128 can be used by the testing system 126, such as for regression testing. In some cases, a developer of the service provider uses a testing application 132 on the developer client device 106 to run tests using synthetic documents 134 received from the server 102. As another example, a customer administrator may perform client-side testing by using a testing application 136 on the customer administrator client device 105 to run tests using synthetic documents 138 received from the server 102. The synthetic documents 138 used by the customer can be specific to that customer and can reflect use cases of using the API 112 by that particular customer. The synthetic documents 134 used by the developer client device 106 can represent use cases of multiple customers of the API 112. Performing testing using the synthetic documents 134 that include different customer use cases can detect specific errors that may not be detected if performing testing just for one customer, for example.

As used in the present disclosure, the term "computer" is intended to encompass any suitable processing device. For example, although FIG. 1 illustrates a single server 102 and single client devices 104, 105, and 106, the system 100 can be implemented using a single, stand-alone computing device, two or more servers 102, or multiple client devices. Indeed, the server 102 and the client devices 104, 105, and 106 may be any computer or processing device such as, for example, a blade server, general-purpose personal computer (PC), Mac®, workstation, UNIX-based workstation, or any other suitable device. In other words, the present disclosure contemplates computers other than general-purpose computers and computers without conventional operating systems. Further, the server 102 and the client devices 104, 105, and 106 may be adapted to execute any operating system, including Linux, UNIX, Windows, Mac OS®, Java™, Android™ iOS, or any other suitable operating system. According to one implementation, the server 102 may also include or be communicably coupled with an e-mail server, a Web server, a caching server, a streaming data server, and/or another suitable server.

Interfaces 150, 152, 153, and 154 are used by the server 102, the end-user client device 104, the customer administrator client device 105, and the developer client device 106, respectively, for communicating with other systems in a distributed environment—including within the system 100—connected to the network 108. Generally, the interfaces 150, 152, 153, and 154 each comprise logic encoded in software and/or hardware in a suitable combination and operable to communicate with the network 108. More specifically, the interfaces 150, 152, 153, and 154 may each comprise software supporting one or more communication protocols associated with communications such that the network 108 or interface's hardware is operable to communicate physical signals within and outside of the illustrated system 100.

The server 102 includes one or more processors 156. Each processor 156 may be a central processing unit (CPU), a blade, an application-specific integrated circuit (ASIC), a field-programmable gate array (FPGA), or another suitable component. Generally, each processor 156 executes instructions and manipulates data to perform the operations of the server 102. Specifically, each processor 156 executes the functionality required to receive and respond to requests from respective client devices, for example.

Regardless of the particular implementation, "software" may include computer-readable instructions, firmware, wired and/or programmed hardware, or any combination thereof on a tangible medium (transitory or non-transitory, as appropriate) operable when executed to perform at least the processes and operations described herein. Indeed, each software component may be fully or partially written or described in any appropriate computer language including C, C++, Java™, JavaScript®, Visual Basic, assembler, Perl®, any suitable version of 4GL, and others. While portions of the software illustrated in FIG. 1 are shown as individual modules that implement the various features and functionality through different objects, methods, or other processes, the software may instead include many sub-modules, third-party services, components, libraries, and such, as appropriate. Conversely, the features and functionality of various components can be combined into single components as appropriate.

The server 102 includes memory 157. In some implementations, the server 102 includes multiple memories. The memory 157 may include any type of memory or database module and may take the form of volatile and/or non-volatile memory, including, without limitation, magnetic media, optical media, random access memory (RAM), read-only memory (ROM), removable media, or any other suitable local or remote memory component. The memory 157 may store various objects or data, including caches, classes, frameworks, applications, backup data, business objects, jobs, web pages, web page templates, database tables, database queries, repositories storing business and/or dynamic information, and any other appropriate information including any parameters, variables, algorithms, instructions, rules, constraints, or references to that associated with the purposes of the server 102.

The end-user client device 104, the developer client device 106, and the customer administrator client device 105 may each generally be any computing device operable to connect to or communicate with the server 102 via the network 108 using a wireline or wireless connection. In general, the end-user client device 104, the developer client device 106, and the customer administrator client device 105 each comprise an electronic computer device operable to receive, transmit, process, and store any appropriate data associated with the system 100 of FIG. 1. The end-user client device 104, the developer client device 106, and the customer administrator client device 105 can each include one or more client applications, including the client application 110, the testing application 132, and the testing application 136, respectively. A client application is any type of application that allows a respective client device to request and view content on the respective client device. In some implementations, a client application can use parameters, metadata, and other information received at launch to access a particular set of data from the server 102. In some instances, a client application may be an agent or client-side version of an application running on the server 102 or another server.

The end-user client device 104, the developer client device 106, and the customer administrator client device 105, respectively, include processor(s) 160, 161, or 162. Each of the processor(s) 160, 161, or 162 may be a central processing unit (CPU), an application-specific integrated circuit (ASIC), a field-programmable gate array (FPGA), or another suitable component. Generally, each processor 160, 161, or 162 executes instructions and manipulates data to perform the operations of the respective client device. Specifically, each processor 160, 161, or 162 executes the functionality required to send requests to the server 102 and to receive and process responses from the server 102.

The end-user client device 104, the developer client device 106, and the customer administrator client device 105 are each generally intended to encompass any client computing device such as a laptop/notebook computer, wireless data port, smartphone, personal data assistant (PDA), tablet computing device, one or more processors within these devices, or any other suitable processing device. For example, a client device may comprise a computer that includes an input device, such as a keypad, touch screen, or another device that can accept user information, and an output device that conveys information associated with the operation of the server 102, or the respective client device itself, including digital data, visual information, or a GUI 165, a GUI 166, or a GUI 167, respectively.

The GUIs 165, 166, and 167 interface with at least a portion of the system 100 for any suitable purpose, including generating a visual representation of the client application 110, the testing application 132, or the testing application 136, respectively. In particular, the GUIs 165, 166, and 167 may be used to view and navigate various Web pages. Generally, the GUIs 165, 166, and 167 provide a respective user with an efficient and user-friendly presentation of business data provided by or communicated within the system. The GUIs 165, 166, and 167 may each comprise a plurality of customizable frames or views having interactive fields, pull-down lists, and buttons operated by the user. The GUIs 165, 166, and 167 each contemplate any suitable graphical user interface, such as a combination of a generic web browser, intelligent engine, and command-line interface (CLI) that processes information and efficiently presents the results to the user visually.

Memories 168, 169, and 170 included in the end-user client device 104, the developer client device 106, and the customer administrator client device 105, respectively, may each include any memory or database module and may take the form of volatile or non-volatile memory including, without limitation, magnetic media, optical media, random access memory (RAM), read-only memory (ROM), removable media, or any other suitable local or remote memory component. The memories 168, 169, and 170 may each store various objects or data, including user selections, caches, classes, frameworks, applications, backup data, business objects, jobs, web pages, web page templates, database tables, repositories storing business and/or dynamic information, and any other appropriate details including any parameters, variables, algorithms, instructions, rules, constraints, or references to that associated with the purposes of the associated client device.

There may be any number of end-user client devices 104, developer client devices 106, and customer administrator client devices 105 associated with, or external to, the system 100. For example, while the illustrated system 100 includes one end-user client device 104, alternative implementations of the system 100 may include multiple end-user client devices 104 communicably coupled to the server 102 and/or the network 108, or any other number suitable to the purposes of the system 100. Additionally, there may also be one or more additional end-user client devices 104 external to the illustrated portion of system 100 that can interact with the system 100 via the network 108. Further, the term "client," "client device," and "user" may be used interchangeably as appropriate without departing from the scope of this disclosure. Moreover, while client devices may be described in terms of being used by a single user, this disclosure contemplates that many users may use one computer or that one user may use multiple computers.

FIG. 2 is a diagram 200 that illustrates fields of a document 202. In this illustration, the document 202 is a purchase order document. The document 202, as shown, represents a presentation of document data generated by, for example, a purchase order API in response to a request from a customer. The document 202 includes field values of fields that are included in the document data generated by the purchase order API. For example, the document 202 includes a company name 204 in a header portion of the document 202, a purchase order date 206, a table 208 of line item field values, and an order total 210. The field values can be considered customer, or user data, for example.

As described above, a service provider may be prevented, due to data privacy or other regulations, from performing analysis on customer data. Rather than analyze user data directly, an encoding of the document data can be performed to generate encoded data that represents a structure of the document data without including specific customer or user data values, and the encoded data can be analyzed. The encoding can be performed, for example, upon or after generation of new or modified purchase order data by the purchase order API. The encoding can include information that represents the presence of field values in document data. For example, shaded values 212, 214, 216, and 218 in a document-structure illustration 220 represent presence, but not values of, the company name 204, the purchase order date 206, the table 208 of line item field values, and the order total 210. Encoding and encoded data are described in more detail below.

Figure 3A:
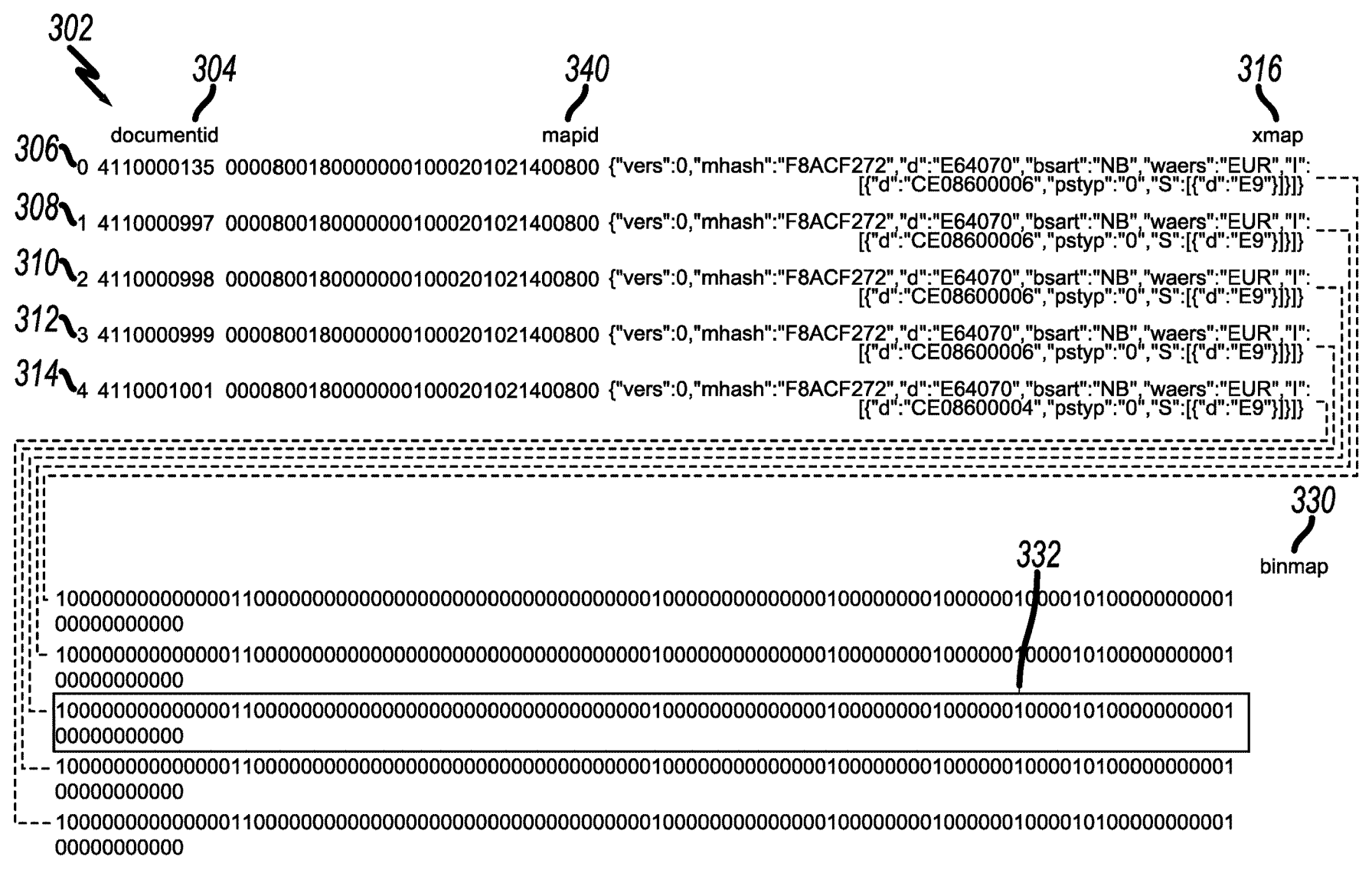
Figure 3B:
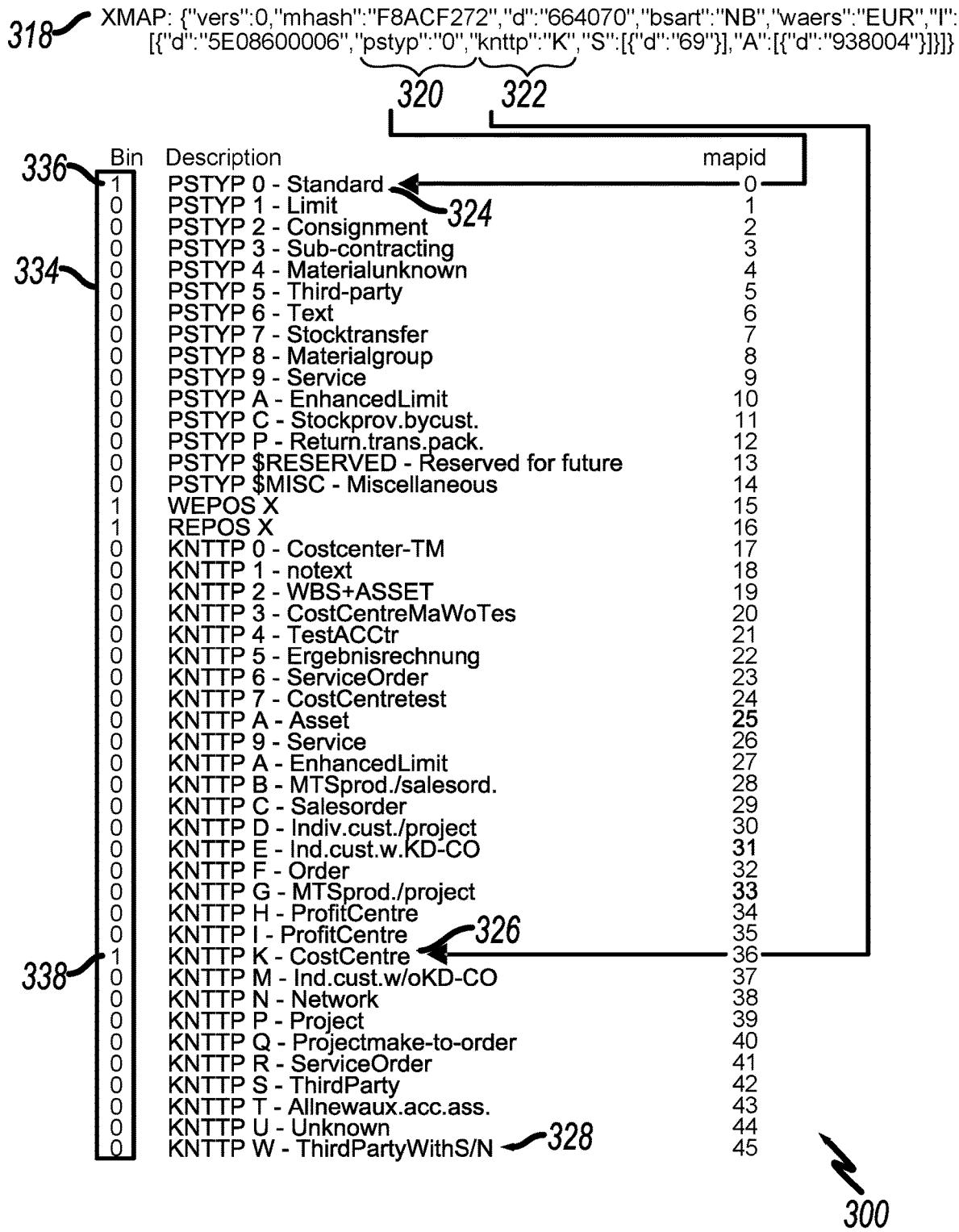

FIGS. 3A-3B are of diagram 300 that illustrates the encoding of document data provided to an application programming interface. The API can receive document data as an incoming message payload corresponding to a customer request, for example. A table 302 illustrates encodings of different documents (e.g., where a document is a collection of document data received by the API). The table 302 includes a document identifier column 304 that includes identifiers of documents that have been encoded. The table 302 includes rows 306, 308, 310, 312, and 314 that correspond to different documents having different document identifiers.

Different types of encodings can be generated for a given document. Each encoding can include metadata that describes a structure of a document without having customer data provided by the customer. Structure information of the document can include information about which parent entities are associated with the document data, for example.

An X-MAP column 316 includes textual entries, where each entry describes field-presence or structural information about the document. The encodings in the X-MAP column may be referred to as "X-MAPs" and may be in, for example, a JSON (JavaScript Object Notation) format, XML (eXtensible Markup Language), YAML (Yet Another Markup Language), or any other suitable textual format. Each X-MAP may describe the entire structure of a corresponding document. For example, an X-MAP 318 corresponds to the X-MAP stored in the X-MAP column 316 in row 310 (e.g., corresponding to a document with a document identifier of 4110000998). For example, an entry 320 in the X-MAP 318 indicates that a standard item category type setting exists in the document. Another example is that the entry 322 in the X-MAP 318 indicates that a cost-center accounts assignment category setting exists in the document. The entries 320 and 322 in the X-MAP 318 correspond to entries 324 and 326 in a field list 328. The field list 328 describes possible types of fields that may exist in the document.

A bitmap column 330 includes binary encodings. Binary encoding can be a different type of encoding that represents the structure of a document. The bitmap column 330 can include binary vectors for each document, for example. A binary vector 332 can represent which fields of the field list 328 are included in the document with document identifier 4110000998. If a field is present in the document, the binary vector 332 includes a one value at a position in the binary vector 332 corresponding to the place of the field in the field list 328. A vertically-displayed binary vector 334 corresponds to the binary vector 332 and is displayed next to the field list 328. Values 336 and 338 correspond to the entries 324 and 326 and indicate the standard item category type-setting and the cost center account assignment category setting in the document, respectively.

An advantage of the binary vector 334 is that the binary vector 334 consumes less space than the corresponding X-MAP 318. Additionally, binary compression techniques can be performed on the binary vector 334, providing further resource savings.

Other types of encodings can be generated from the document data (or from another encoding). For example, a MAP-ID (map identifier) column 340 stores identifier values that each represent significant fields or structure information within a document (e.g., where important fields may be predefined) rather than an entire document structure.

Figure 4:
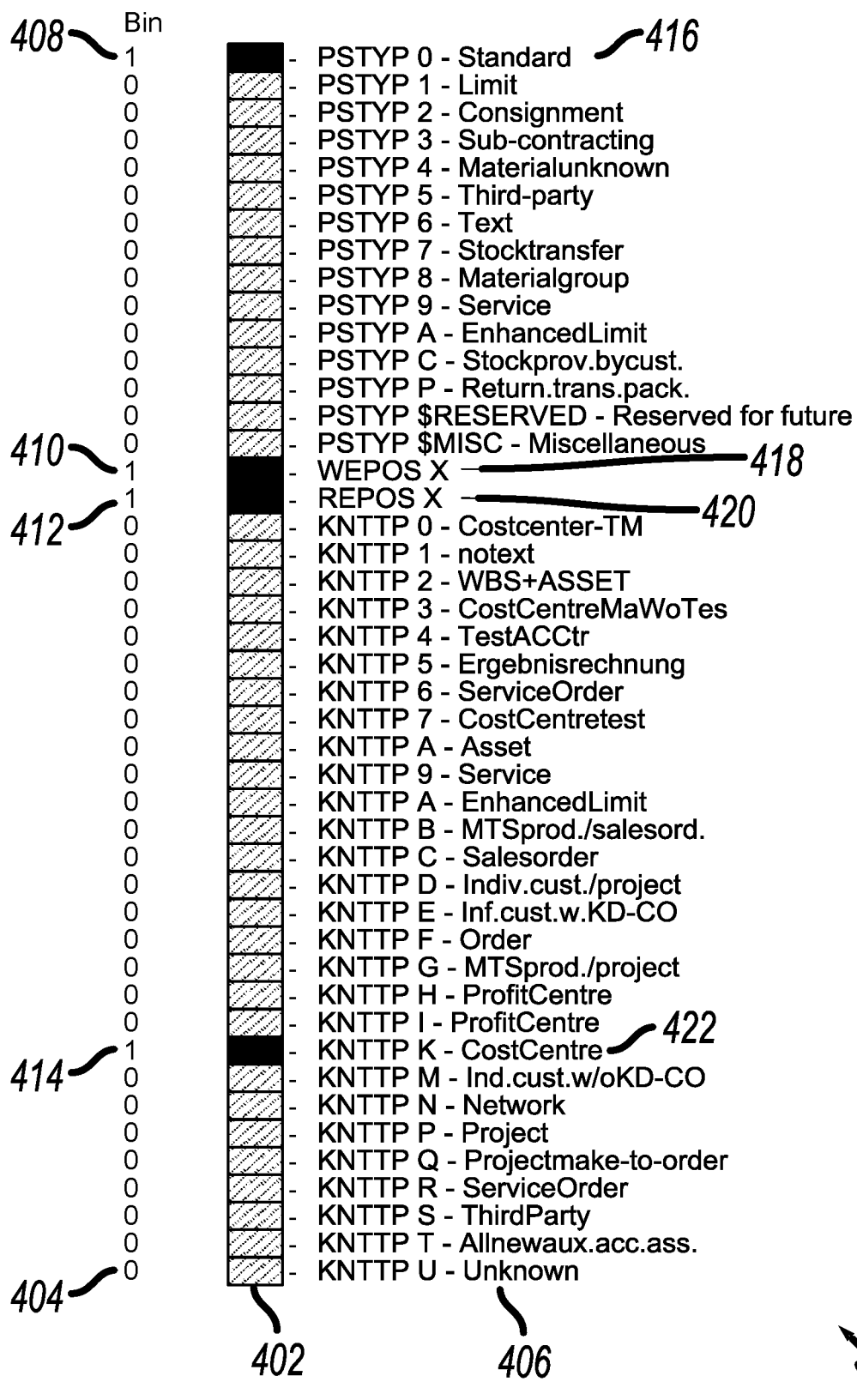
FIG. 4 is a diagram that illustrates a color map for visualization of a binary vector.

FIG. 4 is a diagram 400 that illustrates a color map 402 for visualization of a binary vector 404. Although a color map is described, other visualizations using approaches other than color can be used. The color map 402 and the binary vector 404 correspond to a field list 406. The field list 406 enumerates possible fields that can be included in a document generated by an API. The binary vector 404 represents which fields of the field list 406 are included in a particular document generated by the API. If a field is present in the document, the binary vector 404 includes a one value at a position in the binary vector 404 corresponding to a field position in the field list 406. For example, values 408, 410, 412, and 414 indicate that fields "PSTYP 0— Standard" 416, "WEPOS X" 418, "REPOS X" 420, AND KNTTP K—CostCentre" 422 are present in the document. Suppose a field is not present in the document. In that case, the binary vector includes a zero value at a position in the binary vector 404 corresponding to a field position in the field list 406.

The color map 402 is a color-coded columnar visualization of the binary vector 404. For example, the color map 402 includes a black-colored cell in a row of the color map 402 if a one is present at a corresponding position in the binary vector 404 and a non-black colored cell in a row of the color map 402 if a zero is present at a corresponding position in the binary vector 404. As described below, groups of color maps of similarly structured documents can be grouped according to document clusters to visualize clusters of documents.

Figure 5:
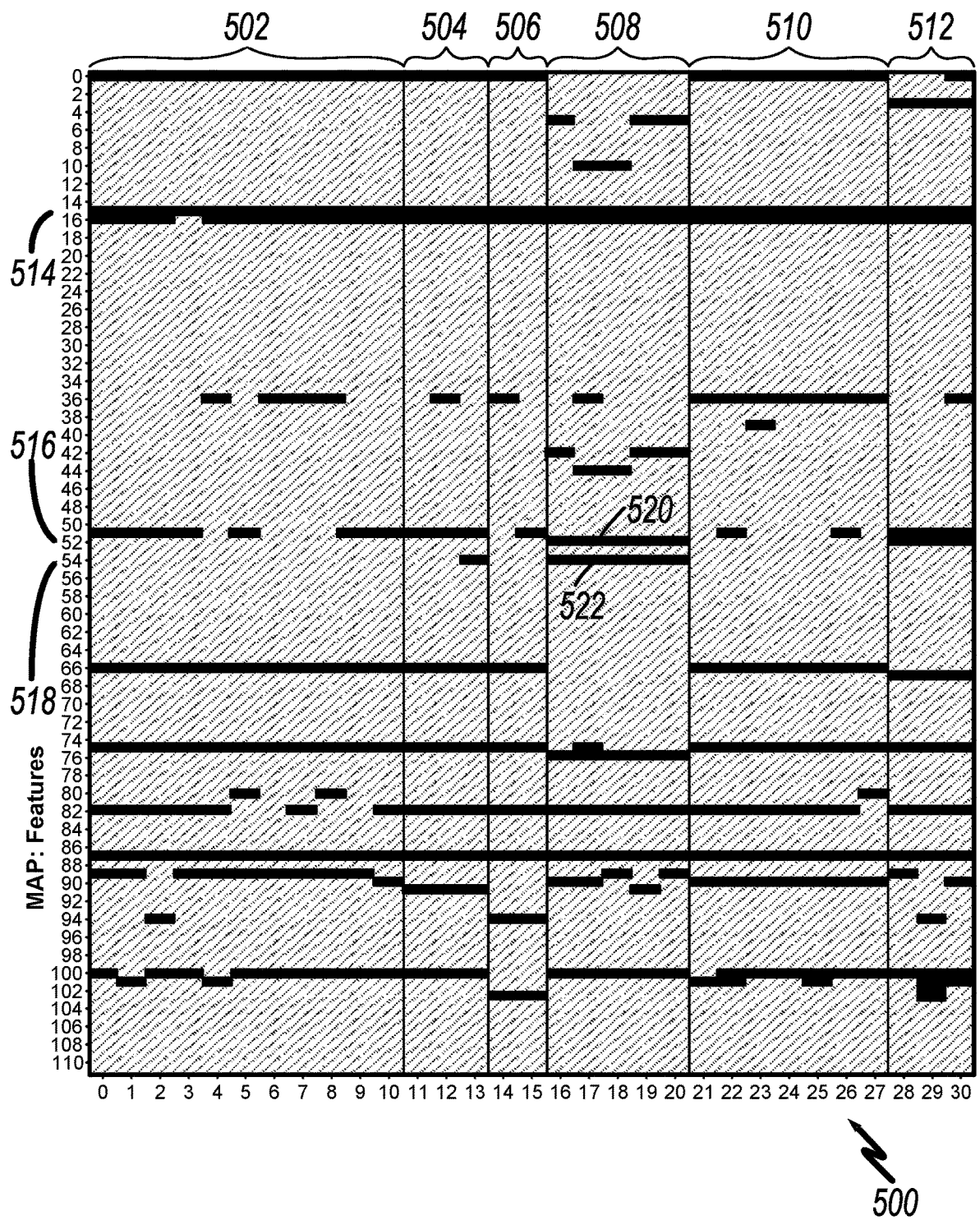
FIG. 5 is a diagram that illustrates clusters of encoded documents.

FIG. 5 is a diagram 500 that illustrates clusters of encoded documents. Clusters 502, 504, 506, 508, 510, and 512 are clusters of similar color maps, with each color map being a visualization of an encoded document (e.g., a visualization of a binary vector encoding of document data). Each cluster 502, 504, 506, 508, 510, and 512 groups have similar color maps (e.g., corresponding to similarly structured documents). As with the color map 402 described above concerning FIG. 4, each color map in each cluster 502, 504, 506, 508, 510, and 512 has a black row indicating the presence of a particular field in document data for a document and a non-black row indicating the absence of a specific field in document data for the document. Each cluster 502, 504, 506, 508, 510, and 512 has a black row at row number 15 (e.g., a row 514), which indicates that each document corresponding to each color map in each of the clusters 502, 504, 506, 508, 510, and 512 included a field corresponding to the row 514. For other fields, different documents may or may not have included the field.

Each cluster 502, 504, 506, 508, 510, and 512 groups color maps according to similar patterns indicating similar inclusion or exclusion of particular fields in documents corresponding to the color maps. For example, most documents do not include field values for two fields corresponding to rows 52 and 54 (e.g., rows 516 and 518, respectively). However, a subset of documents does include both of these two fields. The cluster 506 groups color maps that correspond to both of these two fields in documents that correspond to the color maps. Grouping criteria that may be used to group color maps in the cluster 506 may include criteria other than the inclusion of the two fields.

A machine learning system can analyze the clusters 502, 504, 506, 508, 510, and 512 to obtain insights regarding using the API using statistical analysis and/or machine or deep learning. For example, each cluster 502, 504, 506, 508, 510, and 512 represents common structures that appear in documents generated by the API. Different clusters may represent specific use cases of the API. In some cases, error analysis can be performed by comparing a new document structure to structures represented by the clusters 502, 504, 506, 508, 510, and 512. Suppose the structure of a new document doesn't sufficiently match any of the common structures represented by the clusters 502, 504, 506, 508, 510, and 512. In that case, the document can be flagged for further analysis (e.g., by an automated process or by an administrator).

Figure 6A:
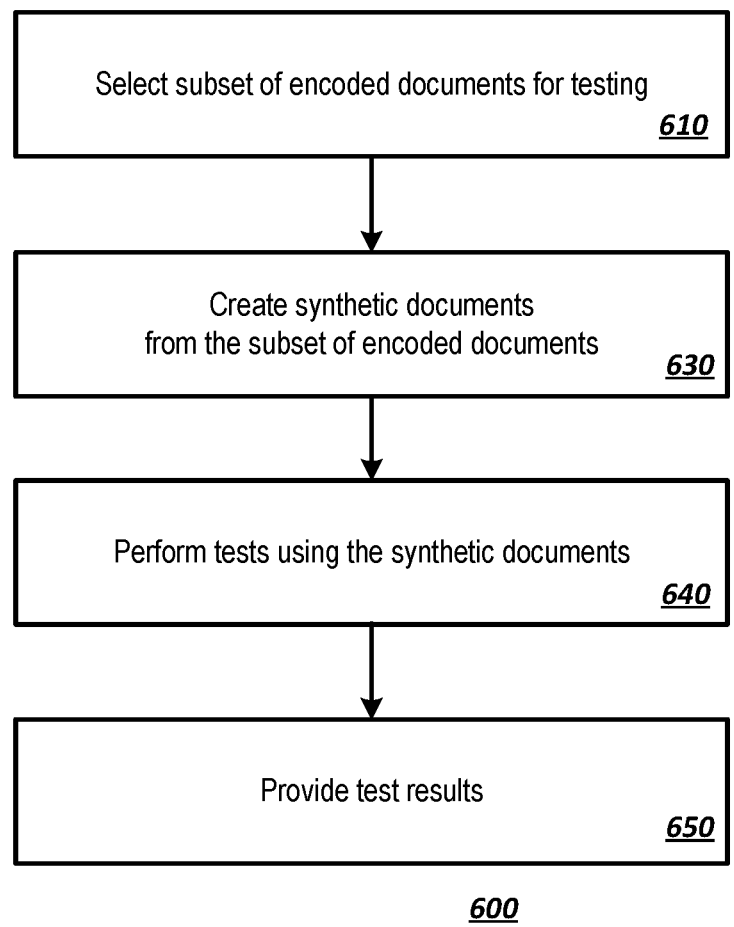
FIG. 6A is a flowchart of an example method for performing tests using synthetic documents.

FIG. 6A is a flowchart of an example method 600 for performing tests using synthetic documents. At 610, a subset of encoded documents is selected for testing from a repository of encoded documents. The repository includes encoded documents generated in response to requests received at an API. The subset can be selected for testing in response to a change in the API. A subset of encoded documents can be selected for testing rather than using all of the encoded documents in the repository for performance reasons, for example. The repository may include more encoded documents than are feasible to test within an acceptable timeframe, for example. Additionally, the repository may include a substantial number of duplicate (or essentially duplicate) encoded documents, and testing more than one duplicate document can waste resources. Although it may be desirable to try all possible combinations of API options, the API may have hundreds of possible fields. The number of possible combinations of fields can result in a combinatorial explosion that results in many possible combinations that are impossible or impractical to test, assuming limited testing hardware, human, and time resources.

The subset of encoded documents selected for testing can represent the most frequent patterns and frequent use cases of the API. Clustering approaches can be used to determine the most frequent patterns. For example, encoded documents with similar structural information (e.g., representing similar numbers and types of fields) can be clustered together. Various types of clustering algorithms can be used.

Figure 6B:
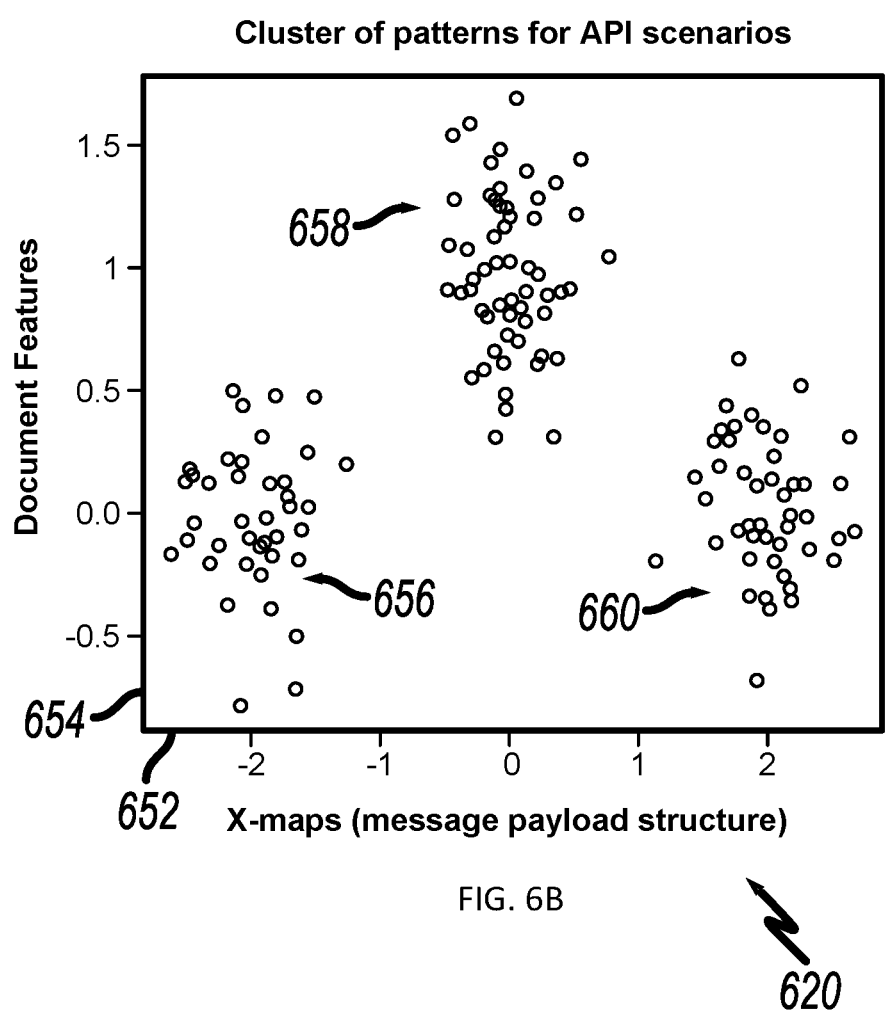
FIG. 6B is a graph that illustrates example clusters of encoded documents.

FIG. 6B is a graph 620 that illustrates example clusters of encoded documents. The graph 620 includes three clusters 656, 658, and 660. The three clusters 656, 658, and 660 indicate that while different API requests represented by the encoded documents are generally at least somewhat other from one another, the API requests fall into three primary patterns, indicating users use the API for three prominent use cases. To select the subset of encoded documents for testing, for each cluster 656, 658, and 660, a representative encoded document at or near the center of the respective cluster can be selected as an encoded document for testing. That is, a representative encoded document can be selected for each main use case of the API.

Referring again to FIG. 6A, at 630, synthetic documents are created from the subset of encoded documents. For example, each encoded document in the subset of encoded documents can be decoded. Decoding can include restoring an unencoded document (e.g., as a synthetic document) based on the structural information in the encoded document. Creating synthetic documents can include identifying portions of the synthetic document at which personal information was included in the original document. Synthetic (e.g., fake/generated) data can be generated and inserted into the synthetic document at positions within the synthetic document corresponding to locations within the original document at which personal information was included.

At 640, tests are performed using synthetic documents. Since the synthetic documents do not include real user personal data, the synthetic documents are compliant with regulations that prevent the use of personal data. Accordingly, the synthetic documents can be used for testing. For example, the synthetic documents can be used to create requests to be provided to the API, to test the API.

At 650, test results are provided. For example, test results can be communicated to a tester. Test results can also be stored for future analysis.

Figure 7:
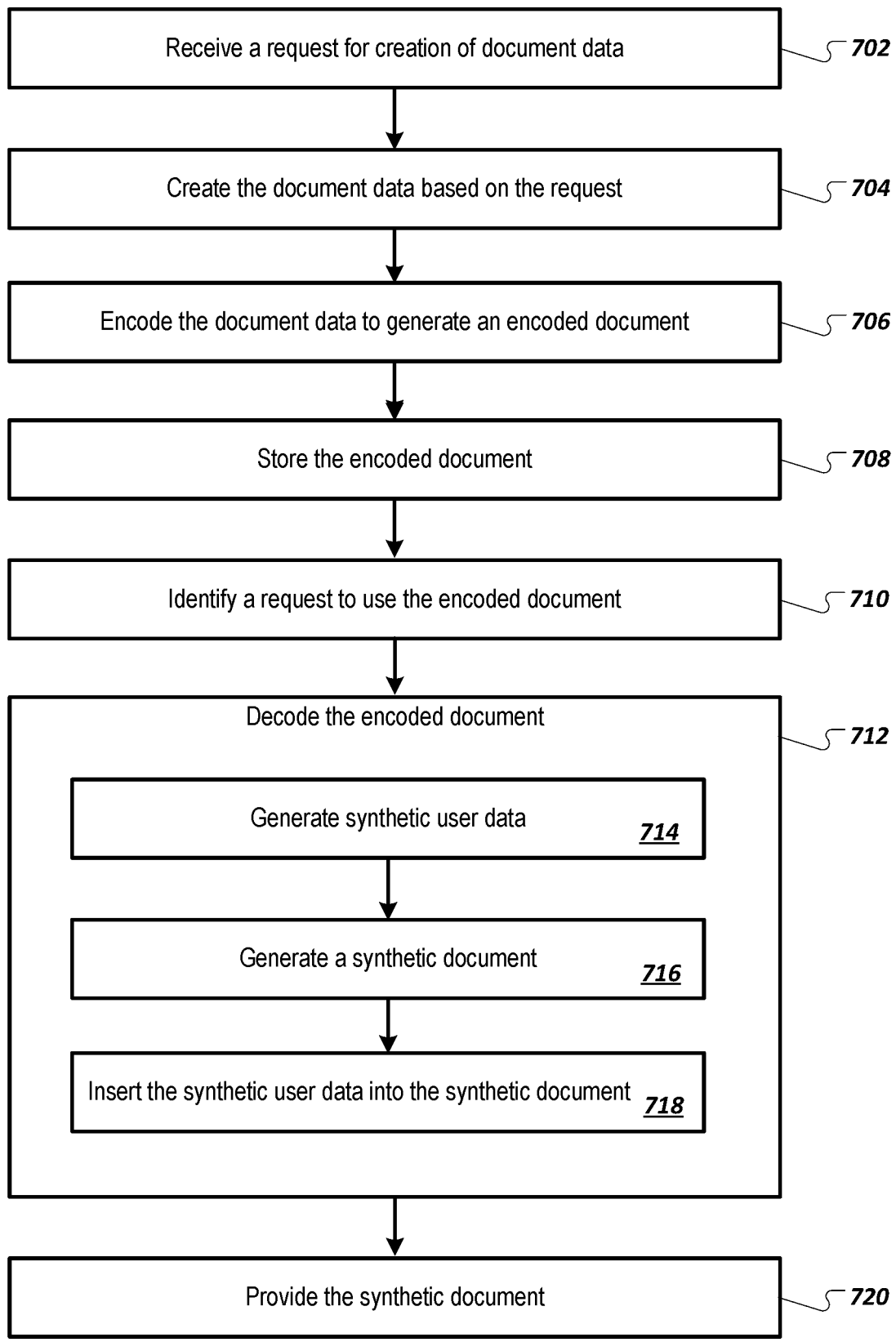
FIG. 7 is a flowchart of an example method for generating data regulation compliant data from application interface data.

FIG. 7 is a flowchart of an example method 700 for generating data regulation-compliant data from application interface data. It will be understood that method 700 and related methods may be performed, for example, by any suitable system, environment, software, and hardware, or a combination of systems, environments, software, and hardware, as appropriate. For example, one or more of a client, a server, or another computing device can be used to execute method 700 and related methods and obtain any data from the memory of a client, the server, or the other computing device. In some implementations, the method 700 and related methods are executed by one or more components of the system 100 described above concerning FIG. 1. For example, the method 700 and related methods can be executed by the server 102 of FIG. 1.

At 702, a request is received from a user device at an application programming interface to create document data for a document. The request includes the personal data of the user. The user's personal data may be subject to one or more data regulations, such as data privacy regulations.

At 704, the document data is created for the document based on the request. The document data includes at least some of the personal data.

At 706, the document data is encoded to generate an encoded document. The encoded document does not include any personal data of the user and includes structural information that describes the structure of the document data. The encoded document can describe fields for which field values are included in the request from the user device without specifying the field values. The encoded document can be a textual document, such as a JSON document or another type of textual document (e.g., the encoded document can have a format as shown in entries in the X-MAP column 316 described above for FIGS. 3A-3B). In some cases, the encoded document can be a binary vector. The binary vector can include a bit for every possible field supported by the application programming interface, with the bit for a possible field having a one value if the request from the user includes a field value for the field and a zero value if the request from the user does not include a field value for the field.

At 708, the encoded document is stored. The encoded document can be stored in a repository that includes other encoded documents for the application programming interface.

At 710, a request to use the encoded document is identified. The request to use the encoded document can be a request to regression test the application programming interface in response to a change in the application programming interface.

At 712, the encoded document is decoded.

At 714, decoding the encoded document includes generating synthetic user data to include in a synthetic document.

At 716, decoding the encoded document includes generating the synthetic document using the structural information included in the encoded document.

At 718, decoding the encoded document includes inserting the synthetic user data into the synthetic document at positions in the synthetic document that correspond to positions of personal data within the document data prior to encoding.

At 720, the synthetic document is provided in response to the request to use the encoded document. For example, the synthetic document can be provided to a test system for regression testing of the application programming interface.

As another example, multiple encoded documents in the repository can be clustered to create at least one cluster of encoded documents. An encoded document can be selected from each cluster as a representative encoded document of the cluster. Each representative encoded document can be decoded and used to regression test the application programming interface in response to a change in the application programming interface.

The preceding figures and accompanying description illustrate example processes and implementable computer techniques. But system 100 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the operations in these processes may take place simultaneously, concurrently, and/or in other orders than as shown. Moreover, system 100 may use processes with additional operations, fewer operations, and/or different operations, so long as the methods remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A computer-implemented method comprising:
receiving a first request to create document data for a document, wherein the first request is received from a user at an application programming interface (API), and wherein the first request includes personal data of the user;
in response to receiving the first request, creating the document data for the document based on the first request, wherein the document data includes at least some of the personal data;

in response to creating the document data, encoding the document data to generate an encoded document, wherein the encoded document does not include any personal data of the user and includes structural information that describes a structure of the document data, and the encoded document describes fields for which field values are included in the first request from the user without specifying the field values;

storing the encoded document in a repository;

identifying a second request to use the encoded document;

decoding the encoded document, wherein the decoding includes:
  generating synthetic user data to include in a synthetic document;
  generating the synthetic document using the structural information included in the encoded document; and
  inserting the synthetic user data into the synthetic document at positions in the synthetic document that correspond to positions of personal data within the document data; and providing the synthetic document in response to the second request to use the encoded document, wherein the document data is created by the API, the API is provided by a server and includes a purchase order interface, a sales order interface, or an invoicing interface, and the server is prohibited from processing the document data unless authorized by the user.

2. The computer-implemented method of claim 1, wherein the encoded document comprises a textual document.

3. The computer-implemented method of claim 2, wherein the textual document is a JSON (JavaScript Object Notation) document.

4. The computer-implemented method of claim 1, wherein the encoded document is a binary vector.

5. The computer-implemented method of claim 4, wherein the binary vector includes a bit for every possible field supported by the API.

6. The computer-implemented method of claim 5, wherein the bit for a possible field has a one value if the first request from the user includes a field value for the field and a zero value if the first request from the user does not include a value for the field.

7. The computer-implemented method of claim 1, wherein:
  the second request to use the encoded document comprises a request to regression test the API in response to a change in the API; and
  providing the synthetic document comprises providing the synthetic document to a test system for regression testing of the API.

8. The computer-implemented method of claim 7, further comprising:
  clustering multiple encoded documents in the repository to create at least one cluster of encoded documents;
  selecting an encoded document from each cluster as a representative encoded document of the cluster;
  decoding each representative encoded document; and
  using decoded documents to regression test the API in response to a change in the API.

9. The computer-implemented method of claim 1, wherein the personal data is subject to at least one data regulation.

10. A system comprising:
  one or more computers; and
  a computer-readable medium coupled to the one or more computers having instructions stored thereon which, when executed by the one or more computers, cause the one or more computers to perform operations comprising:
    receiving a first request to create document data for a document, wherein the first request is received from a user at an application programming interface (API), and wherein the first request includes personal data of the user;
    in response to receiving the first request, creating the document data for the document based on the first request, wherein the document data includes at least some of the personal data;
    in response to creating the document data, encoding the document data to generate an encoded document, wherein the encoded document does not include any personal data of the user and includes structural information that describes a structure of the document data;
    storing the encoded document in a repository;
    identifying a second request to use the encoded document;
    decoding the encoded document, wherein the decoding includes:
      generating synthetic user data to include in a synthetic document;
      generating the synthetic document using the structural information included in the encoded document; and
      inserting the synthetic user data into the synthetic document at positions in the synthetic document that correspond to positions of personal data within the document data; and
    providing the synthetic document in response to the second request to use the encoded document, wherein the document data is created by the API, the API is provided by a server and includes a purchase order interface, a sales order interface, or an invoicing interface, and the server is prohibited from processing the document data unless authorized by the user.

11. The system of claim 10, wherein the encoded document comprises a textual document.

12. The system of claim 11, wherein the textual document is a JSON (JavaScript Object Notation) document.

13. The system of claim 10, wherein the encoded document describes fields for which field values are included in the first request from the user without specifying the field values.

14. The system of claim 10, wherein the encoded document is a binary vector.

15. A computer program product encoded on a non-transitory storage medium, the product comprising non-transitory, computer-readable instructions for causing one or more processors to perform operations comprising:
  receiving a first request to create document data for a document, wherein the first request is received from a user at an application programming interface (API), and wherein the first request includes personal data of the user;
  in response to receiving the first request, creating the document data for the document based on the first request, wherein the document data includes at least some of the personal data;
  in response to creating the document data, encoding the document data to generate an encoded document, wherein the encoded document does not include any personal data of the user and includes structural information that describes a structure of the document data;
storing the encoded document in a repository;
identifying a second request to use the encoded document;
decoding the encoded document, wherein the decoding includes:
  generating synthetic user data to include in a synthetic document;
  generating the synthetic document using the structural information included in the encoded document; and
  inserting the synthetic user data into the synthetic document at positions in the synthetic document that correspond to positions of personal data within the document data; and
providing the synthetic document in response to the second request to use the encoded document, wherein the document data is created by the API, the API is provided by a server and includes a purchase order interface, a sales order interface, or an invoicing interface, and the server is prohibited from processing the document data unless authorized by the user.

16. The computer program product of claim 15, wherein the encoded document comprises a textual document.

17. The computer program product of claim 16, wherein the textual document is a JSON (JavaScript Object Notation) document.

18. The computer program product of claim 15, wherein the encoded document describes fields for which field values are included in the first request from the user without specifying the field values.

19. The computer program product of claim 15, wherein the encoded document is a binary vector.

* * * * *